United States Patent [19]
Gore et al.

[11] Patent Number: 5,374,091
[45] Date of Patent: Dec. 20, 1994

[54] VACUUM GRIPPER ASSEMBLY FOR A ROBOTIC DEVICE

[75] Inventors: Kiron Gore, Coral Springs; Timothy J. Dinwiddie, Plantation; Alan E. Clayton, Ft. Lauderdale, all of Fla.

[73] Assignee: Motorola, Inc., Schaumburg, Ill.

[21] Appl. No.: 161,625

[22] Filed: Dec. 6, 1993

[51] Int. Cl.⁵ .............................................. B25J 15/06
[52] U.S. Cl. ...................................... 294/64.1; 901/40
[58] Field of Search ................... 294/2, 64.1; 29/740, 29/743; 269/21; 271/90, 91, 94, 107; 279/3; 414/627, 737, 752; 901/40

[56] References Cited

U.S. PATENT DOCUMENTS

| | | |
|---|---|---|
| 4,621,853 | 11/1986 | Fink . |
| 4,728,135 | 3/1988 | Sugimura et al. .................. 294/64.1 |
| 4,762,354 | 8/1988 | Gfeller et al. .................. 294/64.1 X |
| 4,815,779 | 3/1989 | Glessner et al. .................... 294/64.1 |
| 4,852,247 | 8/1989 | Hawkswell .................. 294/64.1 X |
| 4,858,974 | 8/1989 | Stannek . |
| 5,024,575 | 6/1991 | Anderson . |
| 5,113,578 | 5/1992 | Jackson et al. .................. 294/64.1 X |

FOREIGN PATENT DOCUMENTS

1193921 6/1970 United Kingdom ............... 294/64.1

*Primary Examiner*—Johnny D. Cherry
*Attorney, Agent, or Firm*—Andrew S. Fuller

[57] ABSTRACT

A gripper assembly for a robotic device includes a first vacuum nozzle (260) having a gripping surface (262), and a second vacuum nozzle (270) having a gripping surface (272). The first nozzle (260) is positioned within the second nozzle (270).

3 Claims, 5 Drawing Sheets

VACUUM GRIPPER ASSEMBLY FOR A ROBOTIC DEVICE

TECHNICAL FIELD

This invention relates generally to gripper assemblies, and more particularly, to gripper assemblies typically used on robots or other automated placement machines.

BACKGROUND

Automated placement machines, such as robots, and the like, are commonly used in transfer operations on automated factory lines. These machines typically include a mechanism, such as a gripper assembly, for gripping or grasping objects which must be transferred from one location to another. A gripper assembly typically employs movable mechanical fingers, suction devices, or combinations of these and other technologies. Vacuum driven suction devices are in common use for applications requiring flexibility in handling parts of varying sizes and weights.

Many vacuum driven gripper designs use vacuum nozzles of varying sizes or diameters which are selectively used based on the size and weight of the object involved. Ordinarily, the larger the diameter of the nozzle, the greater the gripping force for that nozzle, given a constant vacuum pressure. In one common gripper design, the gripper assembly includes multiple nozzles of varying shapes and sizes arranged on a rotary head. The head is rotated as desired to select the most appropriate nozzle for a given task. FIG. 1 illustrates various orientations of a prior art four nozzle rotary head gripper assembly 10 operating within a predetermined work space 12. There are several problems associated with these multiple nozzle gripper assemblies. First, these assemblies tend to be large, thus consuming valuable work space. As depicted in FIG. 1, the effective work space 25 is reduced to accommodate the varying distances of the nozzles from the center of the rotary head. Second, separate control logic and support hardware (not shown) are usually required for each nozzle 20. Third, the weight associated with the support hardware reduces the effective pay lead of the machine. Ordinarily, the machine must be slowed to accommodate the weight, thereby reducing the effective speed of the machine, and hence increasing the manufacturing cycle time. Fourth, maintenance cost is high. Each nozzle 20 must be calibrated with respect to the center of the rotary head 15.

A second approach to vacuum driven gripper design uses a single nozzle with tip or tool changing capabilities. The diameter of the gripping surface of the nozzle is changed by selecting from among tips of different sizes. It can be readily appreciated that valuable time is consumed while tool changes are occurring. Additionally, there is a high calibration cost involved with teaching the location of the various tips. Thus, this approach is expensive in manufacturing cycle time, and direct labor costs.

Vacuum driven gripper assemblies are useful for a variety of automated transfer functions in manufacturing operations. However, prior art grippers tend to have a high acquisition and operating cost. Additionally, valuable manufacturing cycle time can be consumed between nozzle changes in multiple nozzle gripper assemblies.

DETAILED DESCRIPTION OF THE PREFERRED EMBODIMENT

Generally, the present invention provides for a gripper assembly such as used on a robotic device, or an automated part placement machine. The gripper assembly includes telescopic vacuum nozzles which are selectively extendible and retractable to present a gripping surface of a variety of sizes. Preferably, the nozzles have gripping surfaces of successively smaller diameters, and are concentrically arranged such that a nozzle with a smaller gripping surface is positioned within a nozzle with a larger gripping surface. Each nozzle is controllable by a controller which determines whether the nozzle is to be extended or retracted, thereby presenting a variety of gripping surfaces. A vacuum source connected to the nozzles selectively provides vacuum pressure which is presented at the gripping surface of a selected nozzle. The controllers for controlling the vacuum pressure and the selection of nozzles may be separate and independent from the robotic device.

Figure 1:
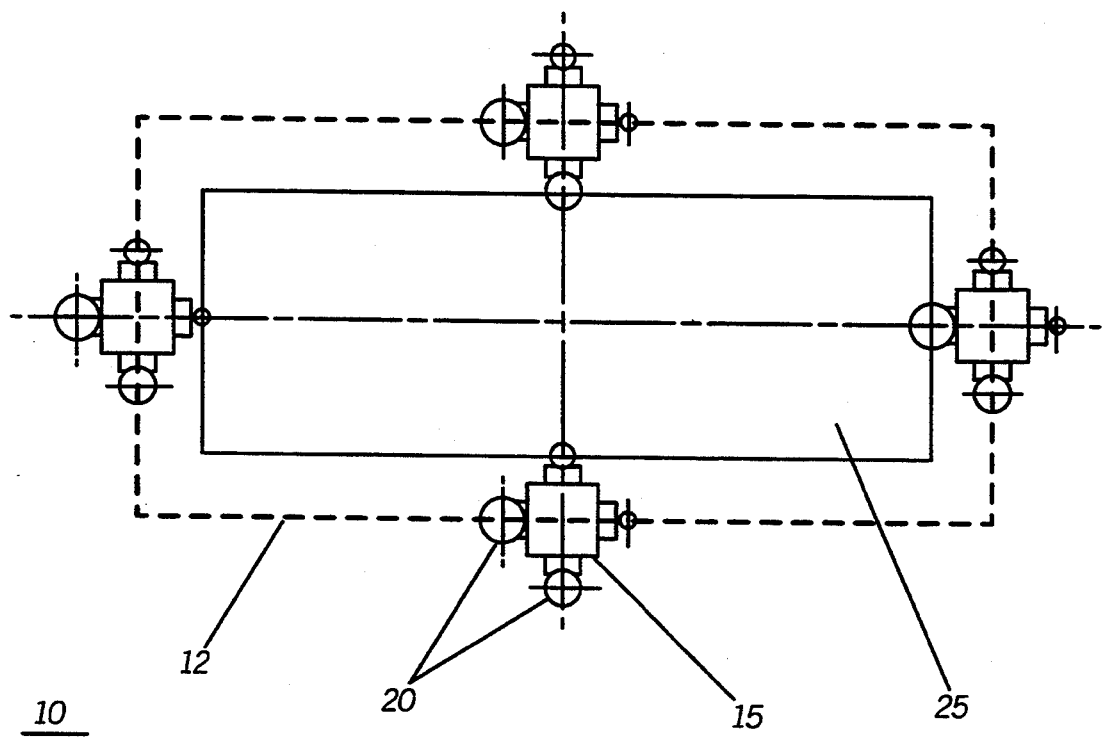
FIG. 1 is a depiction of various orientations of a prior art multiple nozzle rotary head gripper assembly.
Figure 2:
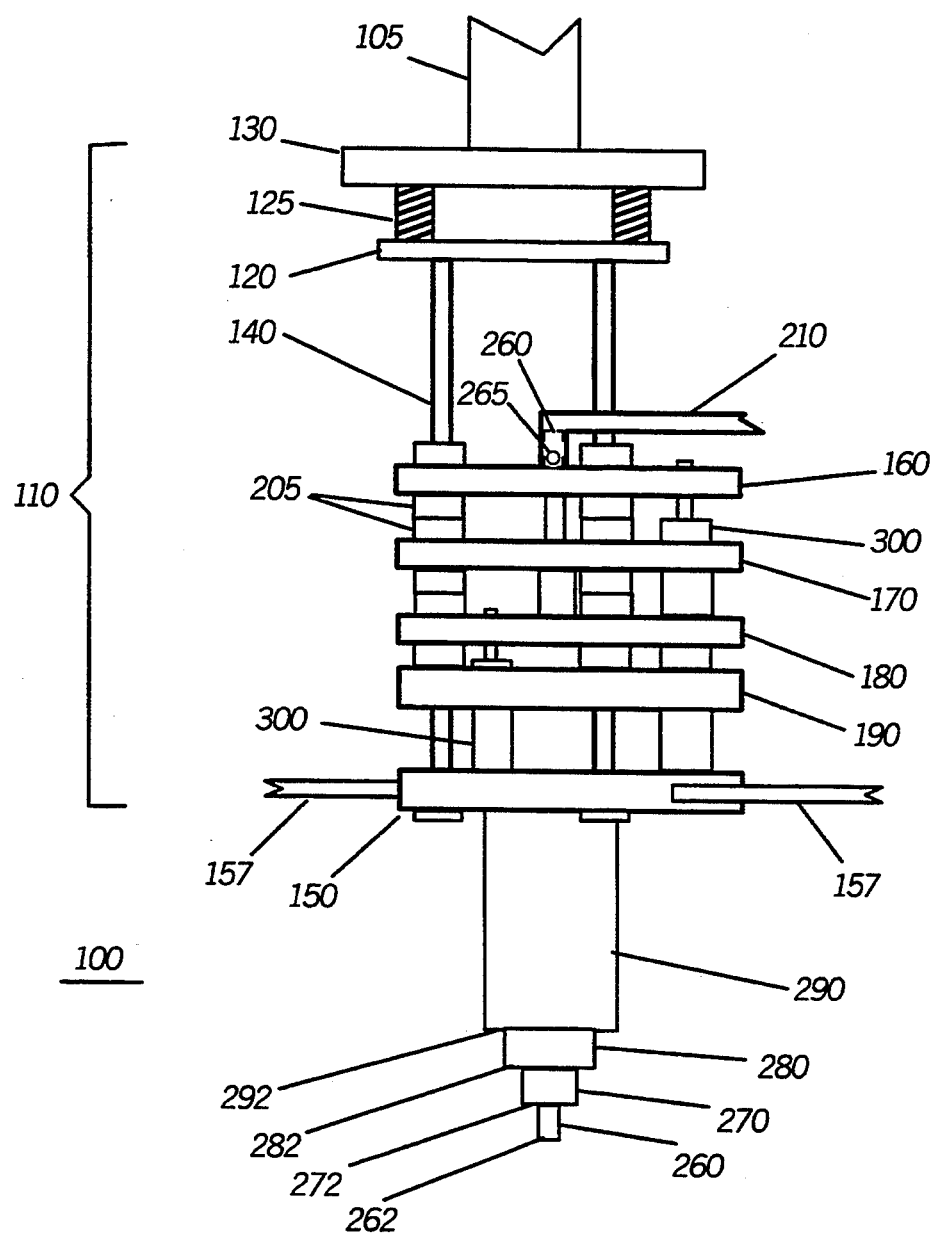
FIG. 2 is a fragmentary view of a gripper assembly which forms a part of a robotic device, in accordance with the present invention.

The present invention can be best understood with references to FIGS. 2-9. FIG. 2 is a fragmentary view of a gripper assembly 100 which forms a part of a robotic device 105, such as one used as an automated parts placement machine. The gripper assembly 100 includes as structural elements, a support apparatus 110, concentric telescoping vacuum nozzles 260, 270, 280, 290, and a mechanism 157, 300 for selectively moving at least some of the vacuum nozzles 260, 270, 280, 290. The robotic device 105 has a controller (not shown) which causes the selection of one of the nozzles 260, 270, 280, 290 for gripping or grasping an object, such as a piece part. The gripper assembly 100 uses vacuum pressure to create a suction effect for gripping an object (not shown), and a release of such vacuum pressure to release the object. The gripping and releasing actions of the gripper assembly 100 can be controlled independently from the robot. Thus, the gripper assembly 100 is adaptable to a variety of robotic devices.

The support apparatus 110 for the gripper assembly 100 has several structural members including an adapter 130, a base flange 120, a fixed flange 190, slidable flanges 160, 170, 180, guide rods 140, and a pressure manifold 150. Preferably, these structural members are formed from metal, or other rigid material. The adapter 130 is used to mount the gripper assembly 100 to a robotic device 105, which forms a support structure. The adapter 130 forms a support base for the remaining structural elements of the gripper assembly 100. The base flange 120 has a flat cylindrical shape. The base flange 120 is mounted to the adapter 130 using compression springs 125 which function as shock absorbers. The guide rods 140 extend, in a substantially parallel fashion, from the base flange 120 to the pressure manifold 150. The guide rods 140 serve several purposes. They provide the structural frame of gripper assembly 100. They rigidly secure the base flange 120, the fixed flange 190, and the pressure manifold 150, and provide a structure to support the slidable flanges 160, 170, 180.

Figure 3:
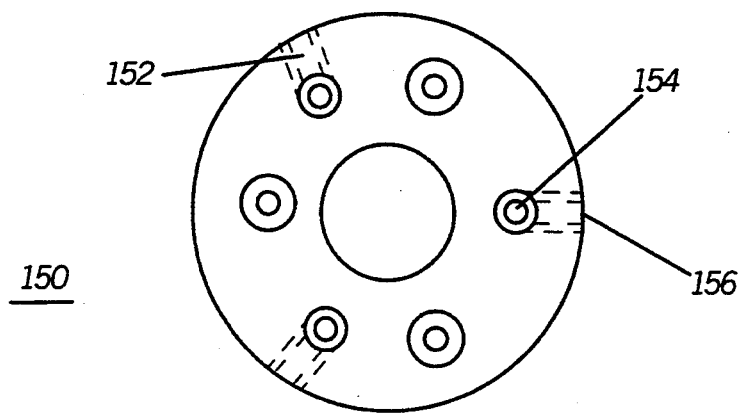
FIG. 3 is a view of the pressure manifold of the gripper assembly of FIG. 2.

FIG. 3, shows a top view of the pressure manifold 150. The pressure manifold 150 serves as a central input point for connecting air sources 157 to the gripper assembly 100. The air sources 157 are needed to drive air pistons 300 which are used to selectively move the slidable flanges 160, 170, 180. Thus, the pressure manifold 150 has air inlets 156 for accepting the air sources 157 and mount points 154 for air pistons 300, and air channels 152 for pneumatically coupling the air pistons 300 to the air sources 157.

Referring back to FIG. 2, the slidable flanges 160, 170, 180 are slidably mounted on the guide rods 140 between the pressure manifold 150 and the base flange 120. In the preferred embodiment, the slidable flanges 160, 170, 180 include a first, second, and third slidable flange 160, 170, 180. The slidable flanges 160, 170, 180 share a number of similar characteristics. First, each slidable flange 160, 170, 180 has a flat cylindrical shape. Preferably, the flanges are formed from metal, or other rigid material. Second, each slidable flange 160, 170, 180 includes holes (not shown) extending therethrough, to accommodate the guide rods 140. Third, each slidable flange 160, 170, 180 has end stops 205 disposed thereon. Fourth, each slidable flange 160, 170, 180 has a centrally mounted vacuum nozzle 260, 270, 280 extending from the flange, through the center of any intervening flanges, nozzles, or other structural elements, and terminating at a point beyond the pressure manifold 150. Thus, first, second, and third nozzles 260, 270, 280, extend from the first, second, and third flange/respectively. A fourth nozzle 290 extends from the fixed flange 190, in the same direction as the other nozzles 260, 270, 280, to a point beyond the pressure manifold 150. Fifth, each slidable flange 160, 170, 180 has an air piston 300 which is attached to the flange at one end, and to an air piston mount point 154 on the pressure manifold 150 at another end. Through holes (not shown) extending through intervening flanges and other structural elements accommodate the air pistons 300. The pistons 300 have substantially similar stroke lengths, and when activated, can cause the slidable flanges 160, 170, 180 to move a distance corresponding to the stroke length, toward the base flange 120. Furthermore, each piston 300 includes a spring (not shown), or other resilient member, which urges the slidable flange 160, 170, 180 toward its original position when the air piston 300 is deactivated.

In the preferred embodiment, the nozzles 260, 270, 280, 290 are long hollow cylindrical tubes, each having a substantially constant diameter along a central axis. Each nozzle 260, 270, 280, 290 has one end which is rigidly attached to a structural member, and an unattached or free end 262, 272, 282, 292. The free end 262, 272, 282, 292 forms the gripping surface for each nozzle 260, 270, 280, 290. Preferably, the nozzles 260, 270, 280, 290, and hence the gripping surfaces 262, 272, 282, 292, are successively smaller in diameter, and are telescopically arranged such that a nozzle with a smaller diameter is movably positioned within a nozzle having a larger diameter. All nozzles 260, 270, 280, 290, except for the fixed fourth nozzle 290, are movable or slidable with respect to each other. Additionally, each movable nozzle 270, 270, 280, and in particular the gripping surface 262, 272, 282 of that nozzle, is selectively extendible beyond the next larger nozzle, and retractable behind other larger nozzles. Thus, the gripping surfaces 262, 272, 282 of the first, second, and third nozzles 260, 270, 280 are selectively extendible beyond and retractable behind the gripping surfaces 272, 282, 292 of the second, third, and fourth nozzles 270, 280, 290, respectively. In the preferred embodiment, the nozzles 260, 270, 280, 290 are cylindrically shaped and concentrically arranged along a central axis extending longitudinally through the nozzles 260, 270, 280, 290. However, although it is convenient to have cylindrically shaped nozzles, and circular gripping surfaces, no limitation is placed on the shape of the nozzles and/or the gripping surfaces. For example, the nozzles and gripping surfaces could have an elliptical shape, rectangular shape, or any other convenient shape.

Having described the structural aspects of the gripper assembly 100, its operational aspects will now be discussed. Individually controllable air sources 157 are connected to the air inlets 156 of the pressure manifold 150 to provide selective control of the pneumatically coupled air pistons 300. In the preferred embodiment, the rest position of the gripper assembly 100 is such that the gripping surface of each successively smaller nozzle, extends beyond the next larger nozzle. Moreover, the slidable flanges 160, 170, 180 are positioned such that the end stops 205 on each flange abut the end stops 205 on the adjacent flange closer to the fixed flange 190. The compressive force of the springs in the air pistons 300 urges the slidable flanges 160, 170, 180 toward the fixed flange 190.

When a piston 300 is pneumatically activated, it exerts a force which urges the attached flange toward the base flange 120. As each slidable flange 160, 170, 180 is mechanically coupled to its integrally attached nozzle 260, 270, 280, movement of the attached air piston 301) causes a corresponding movement of the gripping surface of the mechanically coupled nozzle. In the preferred embodiment, the travel ranges of the first and second nozzles 260, 270 with respect to the second and third nozzles 270, 280, respectively, are substantially equal. Travel range is defined by the range of movement of one movable nozzle with respect to another along a central axis common to the nozzles 260, 270, 280, 290. Each air piston 300 may be independently activated for selectively moving the gripping surface of a nozzle. Selective activation of an air piston 300 causes movement of the attached flange toward the base flange 120 and correspondingly, the retraction of the gripping surface of the mechanically coupled nozzle. Additionally, the configuration is such that movement of one flange toward the base flange 120 causes the movement of all other flanges between that flange and the base flange 120, and hence, the retraction of the attached nozzles. Deactivation of the air piston 300 causes the urging of the mechanically coupled nozzle back to its original position.

To further highlight the benefits of the present invention, the operation of the gripper assembly 100 and the telescopic nozzle arrangement will be more closely examined. Vacuum pressure for the gripper assembly 100 is provided by a vacuum source 210 connected to a vacuum port 265 on the first nozzle 260. The vacuum source 210 is controllable by a controller (not shown) to selectively apply vacuum pressure to the gripper assembly 100 to produce a gripping force. In the preferred embodiment, the gripping force (F) is given by the expression, $F = 0.25 * P * \pi * D^2$, where P is the vacuum pressure, and D is the diameter of the gripping surface of the most extended nozzle. As mentioned earlier, the gripper assembly 100 is selectively controllable to extend or retract specific nozzles 260, 270, 280. The extension and retraction of nozzles 260, 270, 280 is used to present different gripping surfaces 262, 272, 282, 292 for the gripper assembly 100. By selectively causing the gripping surface of a selected nozzle to be more extended than the gripping surfaces of the other nozzles, the desired gripping force is achieved. Thus, the gripper assembly 100 is controllable to present the appropriate gripping surface, and correspondingly the appropriate gripping force, for a given task.

Figure 4:
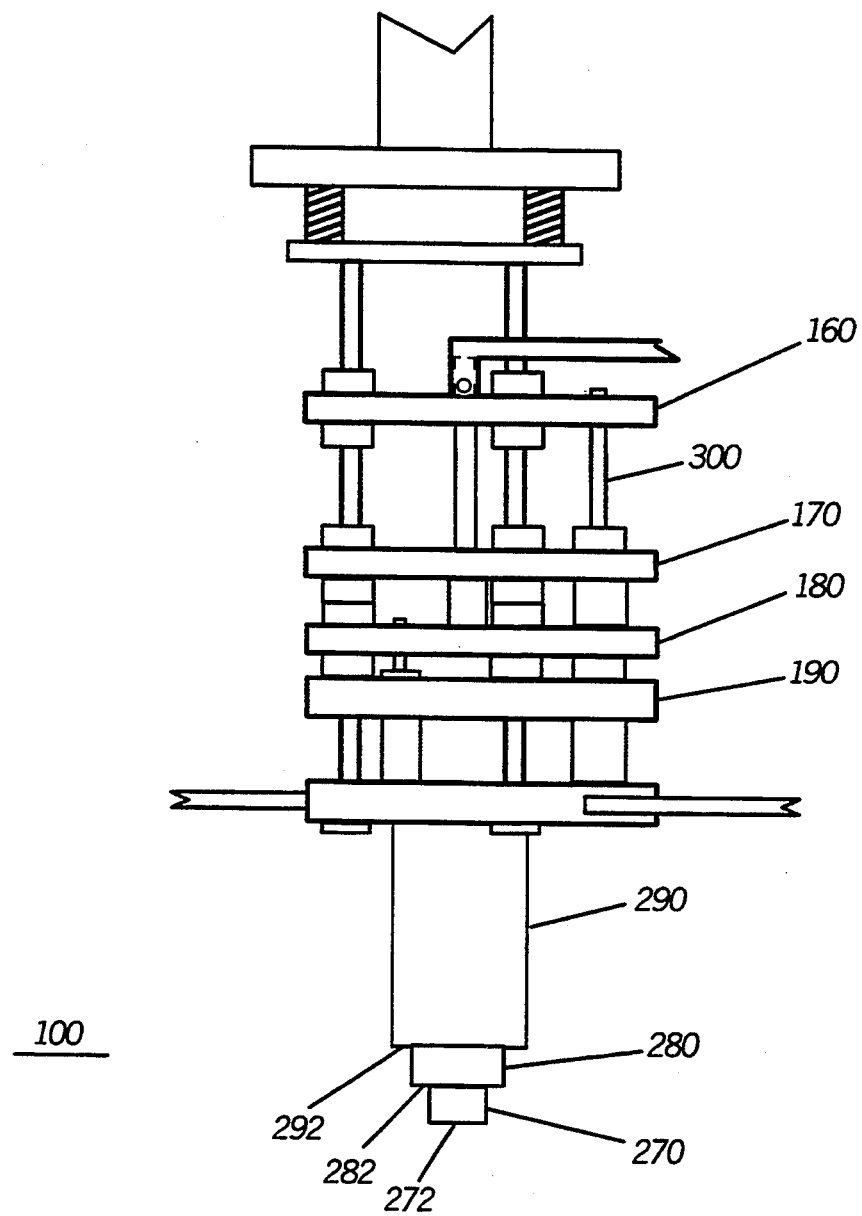
FIG. 4 is a second orientation of the gripper assembly of FIG. 2, in which one nozzle has been retracted.
Figure 5:
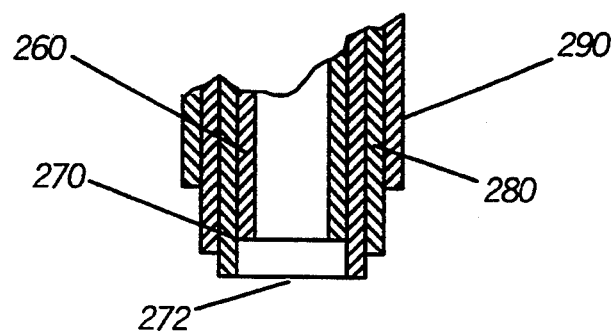
FIG. 5 is a fragmentary cross-sectional view of the nozzle positions of the orientation of the gripper assembly of FIG. 4.
Figure 6:
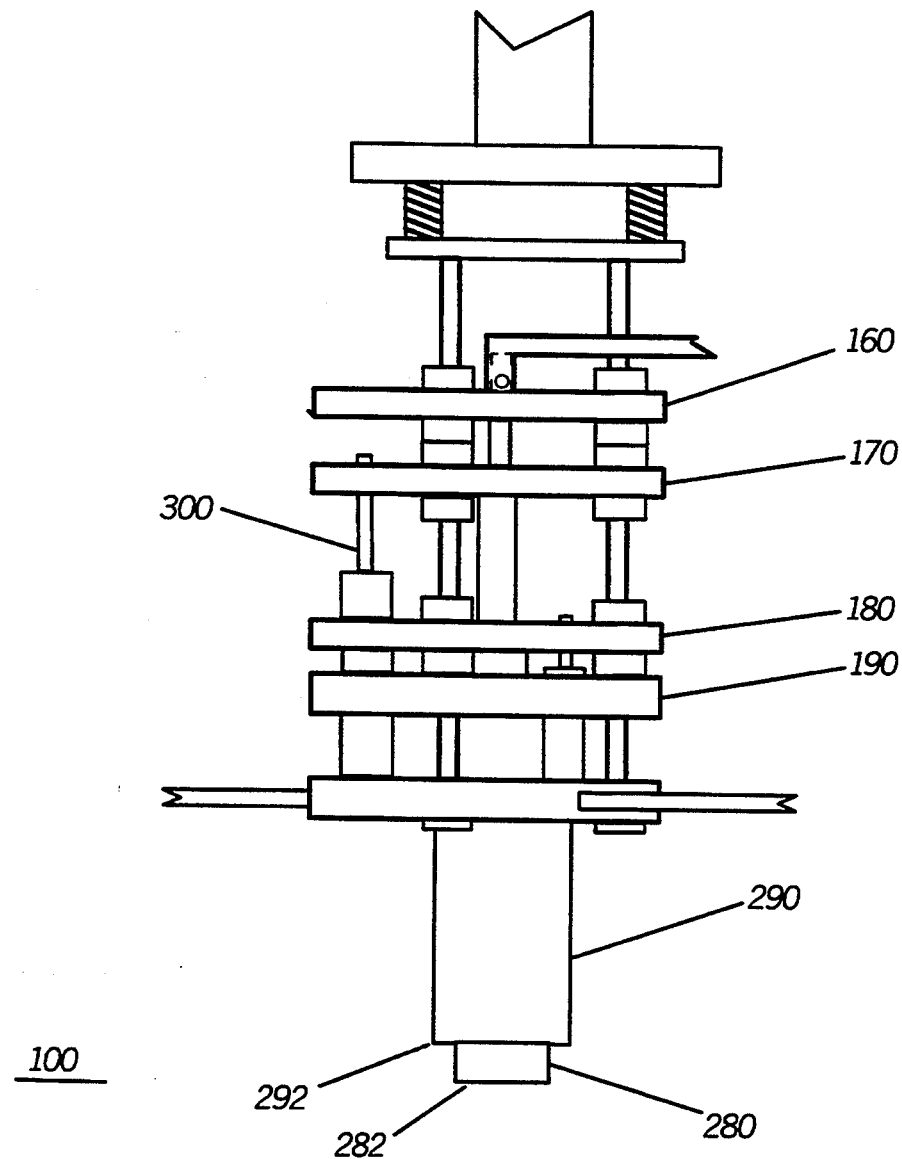
FIG. 6 is a third orientation of the gripper assembly of FIG. 2, in which two nozzles have been retracted.
Figure 7:
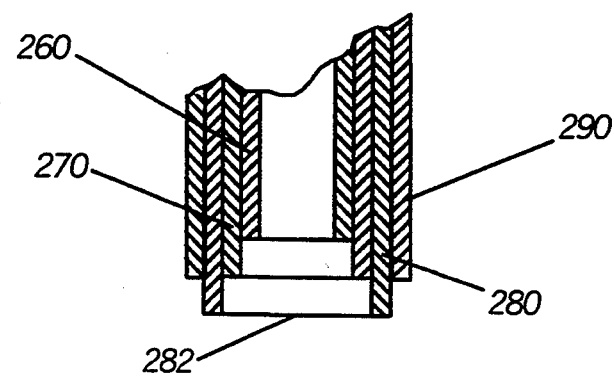
FIG. 7 is a fragmentary cross-sectional view of the nozzle positions of the orientation of the gripper assembly of FIG. 6.
Figure 8:
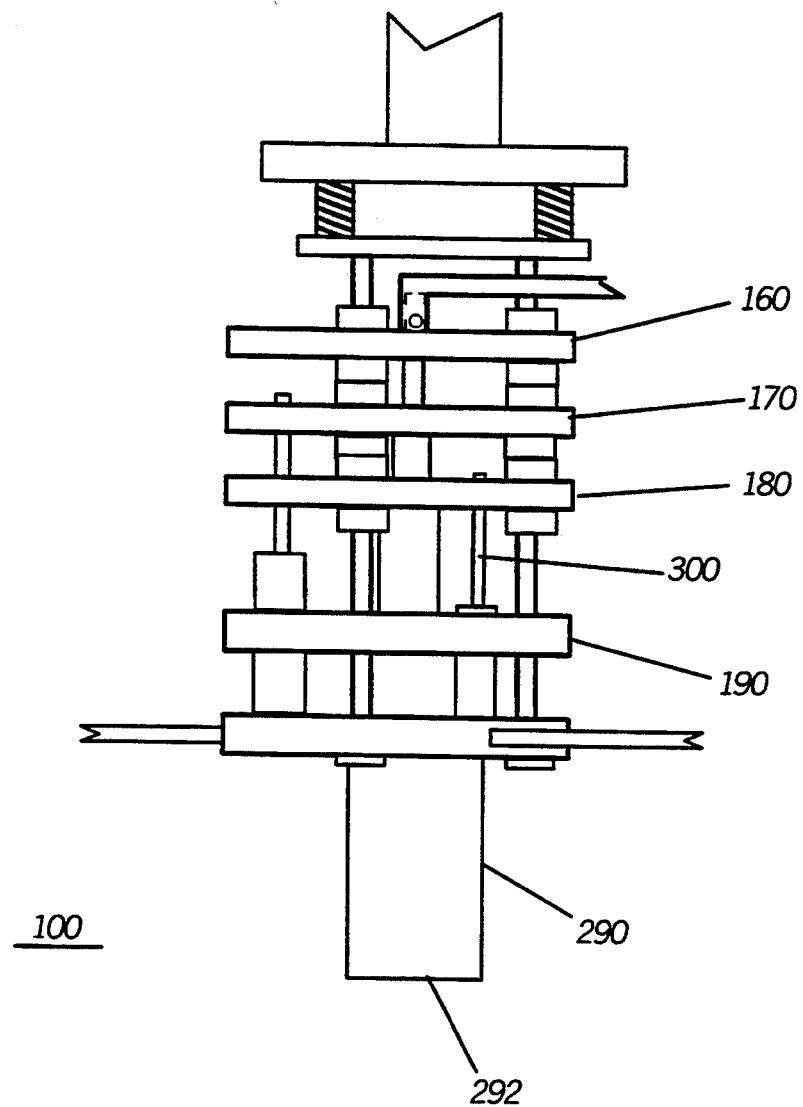
FIG. 8 is a fourth orientation of the gripper assembly of FIG. 2, in which three nozzles have been retracted.
Figure 9:
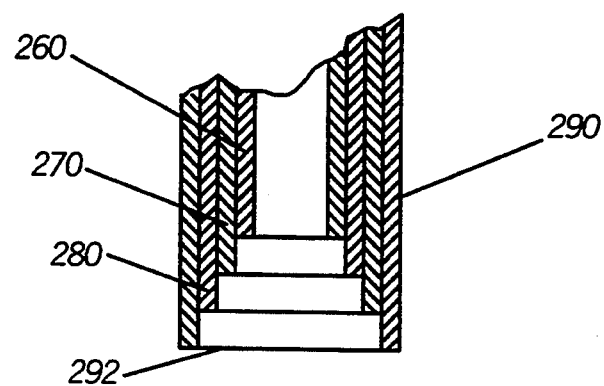
FIG. 9 is a fragmentary cross-sectional view of the nozzle positions of the orientation of the gripper assembly of FIG. 8.

FIGS. 2, 4–9 illustrate the various configurations of the nozzles 260, 270, 280, 290 of the gripper assembly 100. In FIG. 2, all nozzles 260, 270, 280, 290 are fully extended, and the gripping surface presented by the gripper assembly 100 is defined by the diameter of the gripping surface 262 of the first nozzle 260. In FIG. 4, the air piston 300 attached to the first flange has been activated, which has caused the first nozzle 260 to be retracted, such that the gripping surface 272 of the second nozzle 270 defines the gripping surface of the gripper assembly 100. FIG. 5 is a fragmentary cross-sectional view of the positioning of the second nozzle 270 with respect to the other nozzles 260, 270, 280. In FIG. 6, the air piston 300 attached to the second flange has been activated, which has caused the first and second nozzles 260, 270 to be retracted, such that the third nozzle 280 defines the gripping surface of the gripper assembly 100. Note that movement of the second flange also caused the movement, of the first flange to also retract the first nozzle 260. FIG. 7 is a fragmentary cross-sectional view of the positioning of the third nozzle 280 with respect to the other nozzles 260, 270, 280. Similarly, FIG. 8 shows the movement of the third, second, and first flanges, such that the fourth nozzle 290 defines the gripping surface of the gripper assembly 100. FIG. 9 is a fragmentary cross-sectional view of the of the positioning of the fourth nozzle 290 with respect to the other nozzles 260. 270, 280.

The present invention offers significant advantages over the prior art. The gripper assembly 100, according to the present invention, provides the flexibility of a multiple nozzle arrangement with significant size, weight, and complexity advantages over prior art gripper assemblies. The gripper assembly 100 may contain as many nozzles as required for the particular application. In applications where work space is a premium, the gripper assembly 100 consumes far less space, when compared to a rotary head multiple nozzle arrangement, thereby increasing the effective work space. Significant weight advantages are realized as multiple controllers, multiple support structures, and multiple vacuum sources typically associated with single nozzle assemblies are eliminated. Nozzle changes are fast, when compared to grippers which must periodically exchange nozzle tips to grasp objects of different sizes. Maintenance and calibration requirements are also substantially reduced. Thus, the present invention provides for a simpler and more cost effective gripper assembly 100 design, which can contribute to improvements in manufacturing cycle time, and reductions in manufacturing costs.

What is claimed is:

1. A vacuum gripper assembly for a robotic device, comprising:
   a first vacuum nozzle having a gripping surface;
   a second vacuum nozzle having a gripping surface, the first nozzle being movably positioned within the second nozzle, the first and second nozzles having a common central axis extending longitudinally through the first and second nozzles, the gripping surface of the first nozzle being selectively retractable behind and extendible beyond the gripping surface of the second nozzle:
   a third vacuum nozzle having a gripping surface, the second nozzle being movably positioned within the third nozzle, the third nozzle sharing the common central axis of the first and second nozzles, the gripping surface of the second nozzle being selectively retractable behind and extendible beyond the gripping surface of the third nozzle;
   a first flange mechanically coupled to the first nozzle;
   a second flange mechanically coupled to the second nozzle;
   means mechanically coupled to the first flange for moving the first nozzle; and
   means mechanically coupled to the second flange for moving the second nozzle and for causing a corresponding movement of the first nozzle.

2. The gripper assembly of claim 1, wherein:
   the first nozzle has a first travel range with respect to the second nozzle along the common central axis; and
   the second nozzle has a second travel range with respect to the third nozzle along the common central axis, the second travel range being substantially equal to the first travel range.

3. The gripper assembly of claim 1, further comprising:
   a vacuum port coupled to the first vacuum nozzle; and
   a vacuum source coupled to the vacuum port, the vacuum source selectively providing vacuum pressure through the vacuum port to the first, second, and third nozzles when each nozzle is selectively extended.

* * * * *